(12) United States Patent
Abeles

(10) Patent No.: US 8,135,634 B2
(45) Date of Patent: Mar. 13, 2012

(54) SYSTEM AND METHOD FOR AUTOMATIC PAYMENT OF FINANCIAL OBLIGATIONS

(75) Inventor: Gary E Abeles, Verona, NJ (US)

(73) Assignee: DynaTax Solutions, Inc., Verona, NJ (US)

( * ) Notice: Subject to any disclaimer, the term of this patent is extended or adjusted under 35 U.S.C. 154(b) by 0 days.

(21) Appl. No.: 13/230,881

(22) Filed: Sep. 13, 2011

(65) Prior Publication Data

US 2012/0005093 A1    Jan. 5, 2012

Related U.S. Application Data

(62) Division of application No. 11/623,083, filed on Jan. 14, 2007, now Pat. No. 8,036,959.

(60) Provisional application No. 60/862,474, filed on Oct. 23, 2006.

(51) Int. Cl.
G06F 17/22 (2006.01)
G06Q 40/00 (2006.01)

(52) U.S. Cl. .............. 705/31; 705/39; 705/40; 705/42

(58) Field of Classification Search .............. 705/31, 705/39, 40, 42
See application file for complete search history.

(56) References Cited

U.S. PATENT DOCUMENTS

| | | | |
|---|---|---|---|
| 5,358,278 A | 10/1994 | Ellis | |
| 6,631,358 B1 | 10/2003 | Ogilvie | |
| 6,789,189 B2 | 9/2004 | Wheeler et al. | |
| 6,898,573 B1 | 5/2005 | Piehl | |
| 7,373,328 B1 | 5/2008 | Butcher, III | |
| 2002/0198832 A1 | 12/2002 | Agee et al. | |
| 2003/0208445 A1 | 11/2003 | Compiano | |
| 2004/0015438 A1 | 1/2004 | Compiano et al. | |
| 2004/0093303 A1 | 5/2004 | Picciallo | |
| 2005/0075975 A1 | 4/2005 | Rosner et al. | |
| 2008/0071641 A1 | 3/2008 | Olson | |
| 2008/0097878 A1 | 4/2008 | Abeles | |
| 2008/0103960 A1 | 5/2008 | Sweeney | |

OTHER PUBLICATIONS

PCT Search Report dated Dec. 3, 2009 for PCT Application No. PCT/US2009/060154, filed Oct. 9, 2009.

*Primary Examiner* — Faris Almatrahi
(74) *Attorney, Agent, or Firm* — Maine Cernota & Rardin

(57) ABSTRACT

The present invention is a method for managing funds in anticipation of paying at least two financial obligations, such as an estimated tax payment and a mortgage payment. The due dates and amounts due are determined from customer financial information. During an escrow period leading up to the first obligation due date, amounts of money are transferred on at least two occasions from a customer account into a second account, whereby the combined value of the transferred amounts substantially matches the estimated tax or other amount due for the first obligation. The transfer amounts and/or timing are adjusted so as to maintain sufficient funds in the customer account for paying the other obligations. The transferred money is used to automatically pay the first obligation on or near the due date. In embodiments, the customer can access the money in the second account until the first financial obligation is paid.

21 Claims, 3 Drawing Sheets

SYSTEM AND METHOD FOR AUTOMATIC PAYMENT OF FINANCIAL OBLIGATIONS

RELATED APPLICATIONS

This application is a divisional of U.S. application Ser. No. 11/623,083, filed on Jan. 14, 2007, which claims the benefit of U.S. Provisional Application No. 60/862,474, filed Oct. 23, 2006. Each of these applications is herein incorporated by reference in its entirety for all purposes.

FIELD OF THE INVENTION

The invention relates to methods for financial management, and more particularly, to methods for managing revenue in preparation for payment of debts.

BACKGROUND OF THE INVENTION

At present, tax authorities, such as the Internal Revenue Service (IRS) provide paper vouchers to tax payers for estimating taxes. The tax payers or their accountants may manually maintain the payment stream to the taxing authorities. Internal Revenue Bulletin #IR-2006-28 dated Feb. 14, 2006 indicates that third-party involvement in reporting or withholding tax payments increases the compliance of tax payment practices. For example, taxes reported under Schedule C, subject to relatively less typical 3rd party-reporting or withholding, has a net misreporting of 57% of wage information, while taxes reported under W-2, subject to typical 3rd party-reporting or withholding has a net misreporting of 1% of wage information. Information misreported under Schedule C contributes to a $68 billion dollar annual payment deficit to the IRS.

A need exists for a means for automatically providing services that minimize noncompliant payments to the taxing authority by Schedule C taxpayers, which may result in costly interest and penalty charges.

SUMMARY OF THE INVENTION

Embodiments of the present invention provide a method and system for accepting financial information from a customer regarding a financial obligation such as an estimated tax payment due to a taxing authority and a date by which the estimated tax or other payment of a financial obligation is due. Amounts of money are periodically impounded from an account held by the customer, where each amount periodically impounded can be less than the estimated tax or other payment due, and the combined value of the amounts impounded by the date substantially match the estimated tax payment or other payment due.

One general aspect of the present invention is a financial management method executed by a data processing system for automatic payment of a first financial obligation of a customer without reducing, avoiding, or deferring any portion of the first financial obligation, the first financial obligation being due to a first creditor by a first payment due date. The method includes receiving financial data corresponding to the customer, the financial data including data regarding the first financial obligation as well as data regarding a second financial obligation of the customer. The method further includes during an escrow period leading up to the first payment due date, reserving customer funds for payment of the second financial obligation. The method also includes in at least two transactions prior to or on the first payment due date, transferring by means of one or more data messages amounts of money from a monetary source corresponding to the customer to a second account, where the sum of the transferred amounts of money is approximately equal to or more than the first payment amount, the transfers being adjusted in at least one of timing and amount so as to avoid depleting the funds reserved for payment of the second financial obligation. And in addition, the method includes in a single transaction prior to or on the first payment due date, transferring from the second account, by means of one or more data messages, an amount of money approximately equal to or more than the first payment amount to an account held or controlled by the first creditor, thereby meeting the first financial obligation without reducing, avoiding, or deferring any portion of the first financial obligation.

In embodiments, reserving customer funds for payment of the second financial obligation includes reserving a fixed amount of funds.

In some embodiments, reserving customer funds for payment of the second financial obligation includes reserving a variable amount of funds. In other embodiments, reserving customer funds for payment of the second financial obligation includes reserving an estimated amount of funds. In still other embodiments, the funds reserved for payment of the second financial obligation are held in the same monetary source from which the amounts of money are transferred to the second account.

Various embodiments further include monitoring during the escrow period an amount of funds available to the customer, calculating a net amount of available funds by subtracting the funds reserved for payment of the second financial obligation from the amount of funds available to the customer, and determining at least one of when to transfer money to the second account and how much money to transfer to the second account according to the net amount of available funds. And in some of these embodiments monitoring the amount of funds available to the customer includes monitoring a balance of funds in the monetary source from which the amounts of money are transferred to the second account.

In embodiments, the first creditor is a taxing authority. In some of these embodiments, the first financial obligation is an estimated tax payment. And some of these embodiments further include determining the estimated tax due as a function of the received financial data.

In certain embodiments the second financial obligation is payable on a monthly basis. In some embodiments, the second financial obligation is a mortgage payment.

In some embodiment, the transfers to the second account are made according to a schedule of periodic transfers, the amounts of the transfers being adjusted so as to avoid depleting the funds reserved for payment of the second financial obligation. In other embodiments the transfers to the second account are made according to a schedule of transfer amounts, the timing of the transfers being adjusted so as to avoid depleting the funds reserved for payment of the second financial obligation.

In certain embodiments the second account belongs to an entity other than the customer. In some embodiments the monetary source is at least one of a bank account, a stock portfolio account, and a trust fund. Other embodiments further include borrowing money so as to provide funds for transfer to the second account.

In various embodiments the transfers to the second account occur approximately one of hourly, daily, weekly, monthly, quarterly, and annually.

In some embodiments, the amounts of money transferred from the monetary source to the second account remain accessible to the customer until they have been transferred to the account held or controlled by the first creditor.

And various embodiments further include during the escrow period reserving customer funds for payment of a plurality of financial obligations other than the first financial obligation.

Another general aspect of the present invention is a computer-readable non-transitory medium containing instructions that can be executed by a computer, causing the computer to perform a financial management method executed by a data processing system for automatic payment of a first financial obligation of a customer without reducing, avoiding, or deferring any portion of the first financial obligation, the first financial obligation being due to a first creditor by a first payment due date. The method includes receiving financial data corresponding to the customer, the financial data including data regarding the first financial obligation as well as data regarding a second financial obligation of the customer. The method further includes during an escrow period leading up to the first payment due date, reserving customer funds for payment of the second financial obligation. The method also includes in at least two transactions prior to or on the first payment due date, transferring by means of one or more data messages amounts of money from a monetary source corresponding to the customer to a second account, where the sum of the transferred amounts of money is approximately equal to or more than the first payment amount, the transfers being adjusted in at least one of timing and amount so as to avoid depleting the funds reserved for payment of the second financial obligation. And in addition, the method includes in a single transaction prior to or on the first payment due date, transferring from the second account, by means of one or more data messages, an amount of money approximately equal to or more than the first payment amount to an account held or controlled by the first creditor, thereby meeting the first financial obligation without reducing, avoiding, or deferring any portion of the first financial obligation.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention will be understood and appreciated more fully from the following detailed description taken in conjunction with the drawings in which.

DETAILED DESCRIPTION

Figure 1:
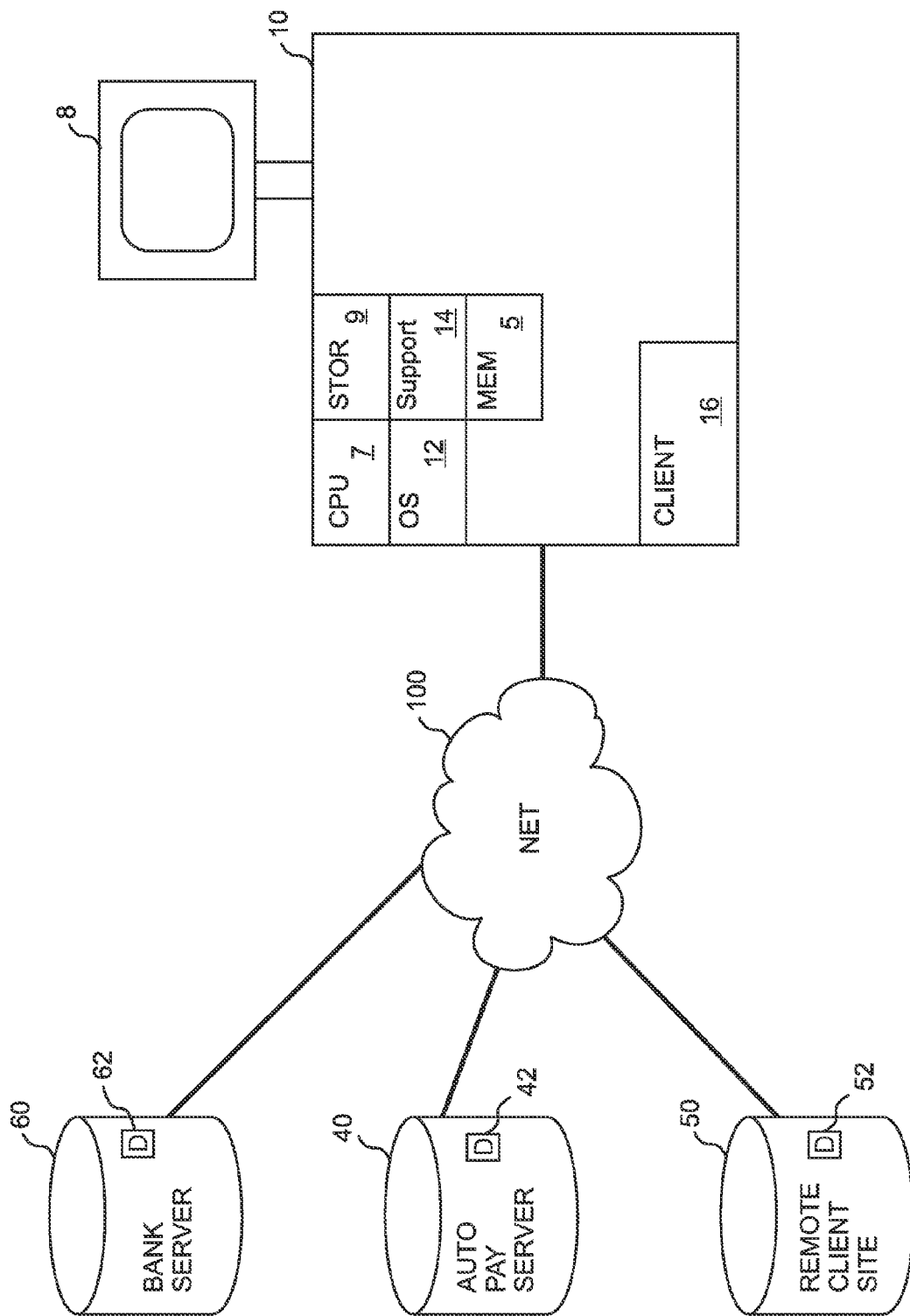
FIG. 1 depicts a local and remote system, according to one embodiment of the present invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. For example, the invention is frequently described in terms of managing finances in anticipation of payment of an estimated tax obligation to a taxing authority. However, it will be clear to one skilled in the art that the present invention can be applied to the satisfaction of any financial obligation.

Furthermore, well-known features may be omitted or simplified herein in order not to obscure the present invention. The processes presented herein are not inherently related to any particular computer or other apparatus. Various general purpose systems may be used with programs in accordance with the teachings herein, or it may prove convenient to construct a more specialized apparatus to perform embodiments of a method according to embodiments of the present invention. Embodiments of a structure for a variety of these systems appears from the description herein. In addition, embodiments of the present invention are not described with reference to any particular programming language. It will be appreciated that a variety of programming languages may be used to implement the teachings of the invention as described herein.

Unless specifically stated otherwise, as apparent from the discussions herein, it is appreciated that throughout the specification discussions utilizing data processing or manipulation terms such as "processing", "computing", "calculating", "determining", or the like, typically refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments described in each of U.S. Pat. No. 6,898,573 B1 to Piehl et al, issued May 24, 2005, US Publication No. 2002/0198832 A1 to Agee et al., published Dec. 26, 2002, US Publication No. 2002/0178039 A1 to Kennedy, published Nov. 28, 2002, Internal Revenue Service form 1040-ES payment voucher, State of New Jersey form NJ-1040-ES NJ gross income tax forms, the First Farmers and Merchants Bank Christmas Club Plan, the Columbia Gas of Pennsylvania and Columbia Gas of Maryland Automated Debit Payment Program, Paypal payment plans and options, and the directpaymentplaning.com website, may be used in accordance with the present invention, and are all incorporated herein by reference in their entirely.

Embodiments of the present invention may enable the customer to periodically allocate small amounts of money that collectively amount to an estimated tax due to a taxing authority. For example, the customer may set aside monies on a weekly basis for payment of income taxes and social security taxes. Embodiments of the present invention may be suitable for customers that are sole proprietors, single member limited liability companies, or partners in a partnership, however, any tax paying entity that has to pay estimated taxes and plan for such payments through in the course of its operations are considered "customers" in the descriptions set forth herein.

Embodiments of the present invention may provide an automated method and system for periodically impounding monies from a customer's bank account, constituting portions of a financial obligation such as an estimated tax for the customer, and accumulating sufficient funds to meet tax payments. The estimated tax may include a predicted amount of money due to the taxing authority and a time and/or date by when the payment is due. The estimated tax may be generated, for example, by an automated mechanism, based on personal and/or financial information input by the customer, or input by a tax professional on behalf of the customer, for example, via a graphical user interface, such as graphical user interface 220, described in further detail below in reference to FIG. 2. Personal and/or financial information may include, for example, a filing status requiring the use of form W-2 or schedule C of form 1040, an annual or quarterly income, a number of dependents, etc. Monies may be impounded from a monetary source selected by the customer, for example, a personal or business bank account, or some other account under the control of the customer. The customer may authorize the automated payment mechanism to periodically impound or transfer monies, for example, by providing an access code to the customer's bank account using a secure channel, for example, over the Internet. The customer may provide monies, for example, according to a predefined contract or agreement.

Embodiments of the present invention may include a computer or computing system to maintain customer accounts, automatically track and/or record estimated tax payments for the customer, and automatically deduct from customer accounts amounts necessary to meet taxing authority payment requirements. Practitioners of ordinary skill will recognize that a financial account in a computer system is a set of data stored in the system that are related to the customer or account owner or the taxing authority, including data representing the amount of money held in the account or for the benefit of the customer or taxing authority or other account owner. Storage of the data is typically by means of well known mass storage devices, including disk drives, optical drives or other data storage technologies.

FIG. 1 depicts a local and remote system, according to one embodiment of the present invention. Local computer 10 may include a memory 5, processor 7, monitor or output device 8, and mass storage device 9. Local computer 10 may include an operating system 12 and supporting software 14 (e.g., a web browser or other suitable local interpreter or software), and may operate a local client process or software 16 (e.g., JavaScript or other suitable code operated by the supporting software 14) to produce an interactive display such as a web page for providing a customer with a graphical user interface, such as graphical user interface 220, described in further detail below in reference to FIG. 2.

In one embodiment of the invention, local computer 10 may accept customer input, maintain customer accounts including automatically tracking and/or recording estimated tax payment requirements for the customer, establish security measures, for example, verifying customer identity, and automatically deducting from customer accounts amounts necessary to meet a tax authority payment requirements. An automated payment server 40 may be used for tracking estimated tax payments of one or more customers and a bank server 60, selected by the customer, may be a source from which monies may be periodically deducted for tax payments. Automated payment server 40 may store, for example, in database 42, estimated tax payment requirements for the customer, security information and account information, which may be transmitted to bank server 60 for executing payment operations. In various embodiments, automated payment server 40 and bank server 60 may be operated by the same or different sources, for example, an automated payment service or bank service, respectively.

In some embodiments, automated payment server 40 may record a history of payments for each customer, for example, as an account balance associated with each customer's accounts. Bank server 60 may include a database 62, for example, for recording customer account details and histories. In some embodiments, customers may have access to the transaction history of their accounts, for example, using a bank website such as website 200, described below in reference to FIG. 2. In some embodiments, the customer may have control of and may adjust the amount or schedule of the automatic or periodic payments or may block or overwrite such payments.

In some embodiments, automated payment server 40 may transmit a signal or message to bank server 60, for example, periodically to impound or transfer an amount of money from the account held by the customer. Messages may include data packets and may be transmitted and/or received between customer local computers 10, automated payment servers 40, banks servers 60, credit card machines, ATMs, and/or other payment devices. According to embodiments of the present invention, bank server 60 may periodically impounding an amount of money from the account held by the customer, where each amount impounded is less than the estimated tax and the combined value of the amounts impounded by the date substantially match the estimated tax.

Bank server 60 may automatically impound monies from the customer monetary source, periodically, for example, hourly, daily, weekly, monthly, quarterly or annually. In an exemplary embodiment, monies may be automatically impounded at a frequency, for example, on a weekly basis, to minimize the amount of monies impounded at one time. Once sufficient impounded funds are accumulated, for example, in a third-party account such as an escrow account, and a payment is due to a taxing authority, the payment may be made from the third party account. In another embodiment, monies may be automatically impounded when sufficient monies have accumulated in the customer's monetary source, for example, when a monthly earning is acquired. In yet another embodiment, monies may only be impounded upon approval from the customer. The impounded monies may be submitted to the appropriate taxing authority automatically by a third party on behalf of the customer at a time, depending on the tax status of the customer, taxes may be paid directly on a quarterly basis or at other times.

In some embodiments, automated payment server 40 may manage tax payments while taking into account other payments, such as monthly bills, mortgages, or other expenses. Based on financial information, for example, provided by a customer, a fixed, variable, or estimated amount of monies may be reserved for various predicted expenses other than tax payment. For example, in some embodiments monies are automatically impounded from a customer's bank account when the monies in the account, excluding monies allocated to other payments or expenses, are determined to be sufficient.

In some embodiments, server 40 may impound monies from various sources. For example, a monetary source may include a bank account, a stock portfolio, a trust fund, etc. For example, if monies are impounded from stocks, impounding may include automatically selling a certain value of stocks. Alternatively, the customer account might automatically borrow money from the bank hosting the account, with the stock portfolio as collateral. The customer and/or system may use preferential planning to select the optimal stocks to sell to acquire the necessary monies for tax payments. For example, if tax payments are deducted from multiple customer accounts operated by multiple banks, multiple bank servers 60 may be used, for example, each bank server 60 maintaining accounts for respective banks. Impounding monies may include for example, deducting, transferring, or moving monies from a customer's monetary source to another location. In one exemplary embodiment, the monies may be transferred to a third-party tax payment account. In another exemplary embodiment, the monies may be transferred to a customer monetary source reserved for tax payment purposes. In another embodiment, impounding monies may not include transferring money, but placing restrictions, warnings or limitations on the customer's use of the money. For example, if a customer attempts to withdraw a portion of money allocated for tax payment from an account, the transaction may be blocked or a warning sign may appear on a payment interface such as an automated teller machine (ATM) or a for example on graphical user interface 220 of a bank or transaction service website, described in further detail below in reference to FIG. 2. In some embodiments, the customer may have control of and may block or overwrite such restrictions. Other methods or operations for impounding monies may be used.

By the date the tax payment is due, sufficient funds for tax payment should have been accumulated by the periodic impounding mechanism. By the date payment is due, automated payment server may calculate estimated tax to deduct from the customer's account and may transmit payment instructions via net 100 to bank server 60, for example, based on the estimated tax calculated. Payment instructions, based on the estimated tax, may include authorization for processing a tax payment or transfer of funds, the amount to be paid and the source and destination for the transfer of funds. Bank server 60 may execute a payment, according to the payment instructions. In some embodiments, payments to the taxing authority may include submitting a customer's personal and/or financial information, including for example social security number associated with the user, the amount to be paid, and appropriate instructions and security data.

Automated payment server 40 may include security and utility code 24 may generate security or verification information; such verification information may be used to allow the appropriate customer to monitor and/or control their accounts for payment of taxes. Such verification information may also be used for metering or billing customers for use of services. In one embodiment, security or verification information includes both the identity of the client process and a domain name. The pairing of the domain name and the client identity may serve as an authentication key. Security or verification information may correspond to or identify the local client in other manners. In some embodiments, automated payment server 40 may analyze customer input and/or authentication information received, for example, from computer 10, to generate authentication or security conditions or information.

Figure 2:
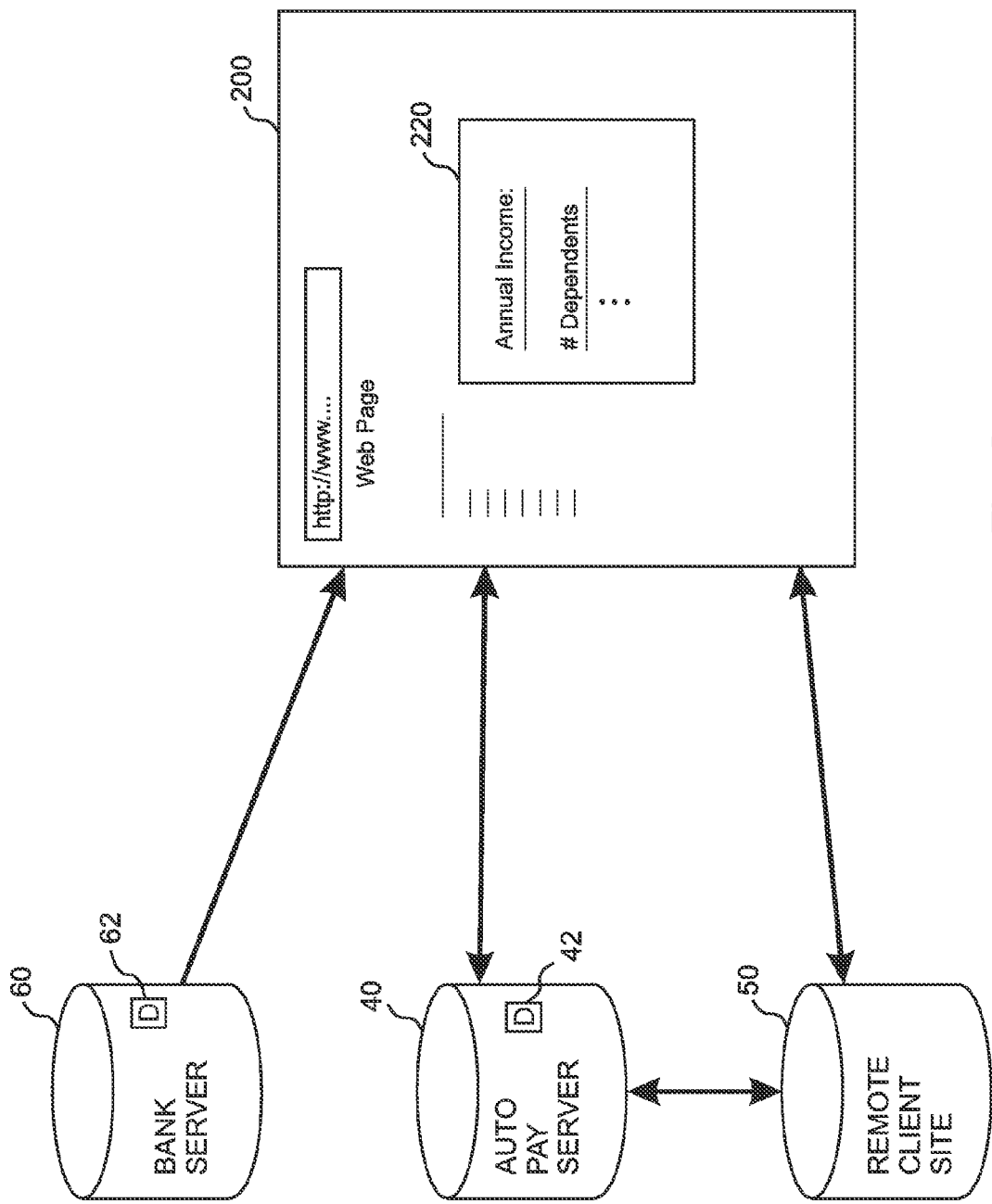
FIG. 2 depicts a web page produced by an embodiment of the present invention, and its interaction with various components of one embodiment of the present invention.

FIG. 2 depicts a web page produced by an embodiment of the present invention, and its interaction with various components of one embodiment of the present invention. Web page 200 may, for example, be displayed on monitor 8. Remote client site 50 may operate web page 200. Web page 200 may include a graphical user interface 220 that may accept an input from a customer such as personal and/or financial information and access to the customer's monetary source.

Customer input may be stored in automated payment server 40, remote client site 50, and/or bank server 60, for example, in databases 42, 52, and 62, respectively. Automated payment server 40 may receive customer input via remote client site 50 or directly from web page 200, via net 100. Customer input may be information specific to a customer, such as the identity of the customer, a filing status requiring the use of form W-2 or schedule C of form 1040, an annual or quarterly income, a number of dependents, an amount of estimated tax payment for the year, the location and access information to a monetary source of funds to pay taxes. In one embodiment, the customer may provide information required in standard tax forms.

In some embodiments, customers may be required to register or enter preliminary information to enlist payment services according to embodiments of the invention. For example, customers may be required to provide personal and/or financial information using graphical user interface 220. Required information may include the customer's name, address, social security number, monetary source information, amount, schedule, and/or restrictions for impounding monies, email address, telephone and fax numbers, etc. Each customer may provide identification information, such as a pin number, which may be required to access the system.

It will be appreciated by those of ordinary skill in the art that the third party account to which the impounded payments are made can be a professional accountant or other service provider. Alternative embodiments of the invention can provide that the service provider have authenticated access to the customer's accounts or that the customer provide the third party service provider the information that determines the estimated tax amount. The service provider can then access, modify or set up the account on the third party servers that request the impounding of monies from the customer's bank accounts. In this way, the service provider determines what the impounding amount is and collects and stores the impounded monies. The third party service provider then, through messages between the third party servers and the IRS servers, make the tax payment that is due.

Although customer interface is depicted using a computer module, other output modules may be used according to embodiments of the present invention. For example, an ATM, telephone, facsimile, or other device-based service may provide automated payment services as described herein.

Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The spirit and scope of the present invention are to be limited only by the terms of the appended claims. It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Figure 3:
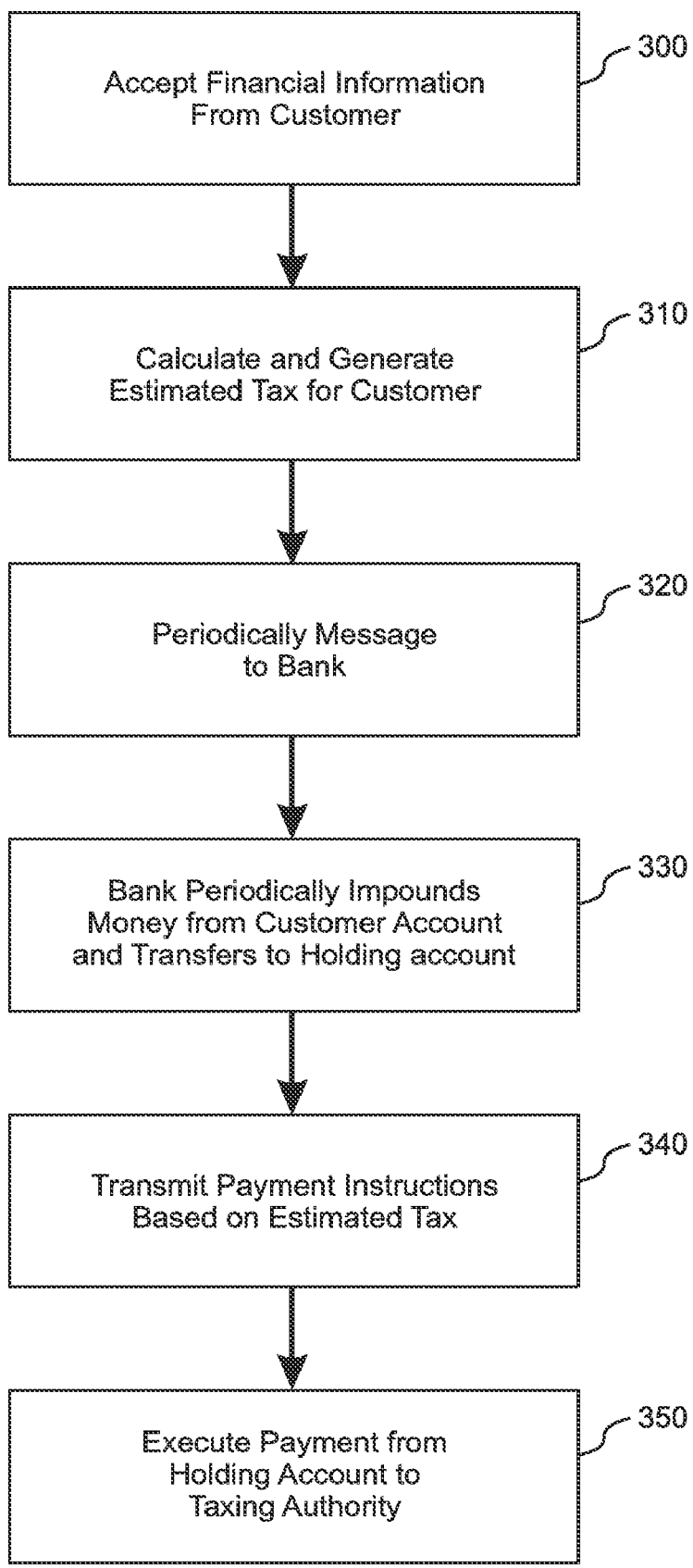
FIG. 3 is a flowchart of a method according to one embodiment of the present invention.

FIG. 3 is a flowchart of a method according to one embodiment of the present invention.

In operation 300, a local client accepts financial information from a customer. For example, a web page is loaded onto a local system and the customer enters information in a graphical user interface provided by the system.

In operation 310, an automated payment server generates an estimated tax for the customer, including an amount due to the taxing authority and a date by which the amount is due.

In operation 320, the automated payment server periodically send a bank server a message to impound and/or transfer an amount of money from an account held by the customer, where each amount is less than the estimated tax and the combined value of the amounts impounded by the date substantially match the estimated tax.

In operation 330, the bank server may periodically impound the amount of money from the customer account indicated by the automated payment server in operation 320, and transfer it to a separate holding account.

In operation 340, by the date payment is due, the automated payment server may transmit payment instructions to the bank server based on the estimated tax generated in operation 310. Payment instructions, based on the estimated tax, may include authorization for processing a tax payment or transfer of funds, the amount to be paid and the source and destination for the transfer of funds.

In operation 350, the bank server may execute a payment from the holding account to the taxing authority, according to the payment instructions. In some embodiments, payments may include submitting a customer's personal and/or financial information, including for example social security number associated with the user, the amount to be paid, and appropriate instructions and security data.

Other operations or series of operations may be used.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A financial management method executed by a data processing system for automatic payment of a first financial obligation of a customer without reducing, avoiding, or deferring any portion of the first financial obligation, the first financial obligation being due to a first creditor by a first payment due date, the method comprising:
   receiving financial data corresponding to the customer, the financial data including data regarding the first financial obligation as well as data regarding a second financial obligation of the customer;
   during an escrow period leading up to the first payment due date, reserving customer funds for payment of the second financial obligation;
   in at least two transactions prior to or on the first payment due date, transferring by means of one or more data messages amounts of money from a monetary source corresponding to the customer to a second account, where the sum of the transferred amounts of money is approximately equal to or more than the first payment amount, the transfers being adjusted in at least one of timing and amount so as to avoid depleting the funds reserved for payment of the second financial obligation; and
   in a single transaction prior to or on the first payment due date, transferring from the second account, by means of one or more data messages, an amount of money approximately equal to or more than the first payment amount to an account held or controlled by the first creditor, thereby meeting the first financial obligation without reducing, avoiding, or deferring any portion of the first financial obligation.

2. The method of claim 1, wherein reserving customer funds for payment of the second financial obligation includes reserving a fixed amount of funds.

3. The method of claim 1, wherein reserving customer funds for payment of the second financial obligation includes reserving a variable amount of funds.

4. The method of claim 1, wherein reserving customer funds for payment of the second financial obligation includes reserving an estimated amount of funds.

5. The method of claim 1, wherein the funds reserved for payment of the second financial obligation are held in the same monetary source from which the amounts of money are transferred to the second account.

6. The method of claim 1, further comprising:
   monitoring during the escrow period an amount of funds available to the customer;
   calculating a net amount of available funds by subtracting the funds reserved for payment of the second financial obligation from the amount of funds available to the customer; and determining at least one of when to transfer money to the second account and how much money to transfer to the second account according to the net amount of available funds.

7. The method of claim 6, wherein monitoring the amount of funds available to the customer includes monitoring a balance of funds in the monetary source from which the amounts of money are transferred to the second account.

8. The method of claim 1, wherein the first creditor is a taxing authority.

9. The method of claim 8, wherein the first financial obligation is an estimated tax payment.

10. The method of claim 9, further comprising determining the estimated tax due as a function of the received financial data.

11. The method of claim 1, wherein the second financial obligation is payable on a monthly basis.

12. The method of claim 1, wherein the second financial obligation is a mortgage payment.

13. The method of claim 1, wherein the transfers to the second account are made according to a schedule of periodic transfers, the amounts of the transfers being adjusted so as to avoid depleting the funds reserved for payment of the second financial obligation.

14. The method of claim 1, wherein the transfers to the second account are made according to a schedule of transfer amounts, the timing of the transfers being adjusted so as to avoid depleting the funds reserved for payment of the second financial obligation.

15. The method of claim 1 where the second account belongs to an entity other than the customer.

16. The method of claim 1 wherein the monetary source is at least one of a bank account, a stock portfolio account, and a trust fund.

17. The method of claim 1 further comprising borrowing money so as to provide funds for transfer to the second account.

18. The method of claim 1 wherein the transfers to the second account occur approximately one of hourly, daily, weekly, monthly, quarterly, and annually.

19. The method of claim 1, wherein the amounts of money transferred from the monetary source to the second account remain accessible to the customer until they have been transferred to the account held or controlled by the first creditor.

20. The method of claim 1, further comprising during the escrow period reserving customer funds for payment of a plurality of financial obligations other than the first financial obligation.

21. A computer-readable non-transitory medium containing instructions that can be executed by a computer, causing the computer to perform the method of claim 1.

* * * * *